Aug. 21, 1923.                                1,465,715
S. KAPLAN
WHEEL FOR AUTOMOBILES
Filed Oct. 25, 1921          4 Sheets-Sheet 1
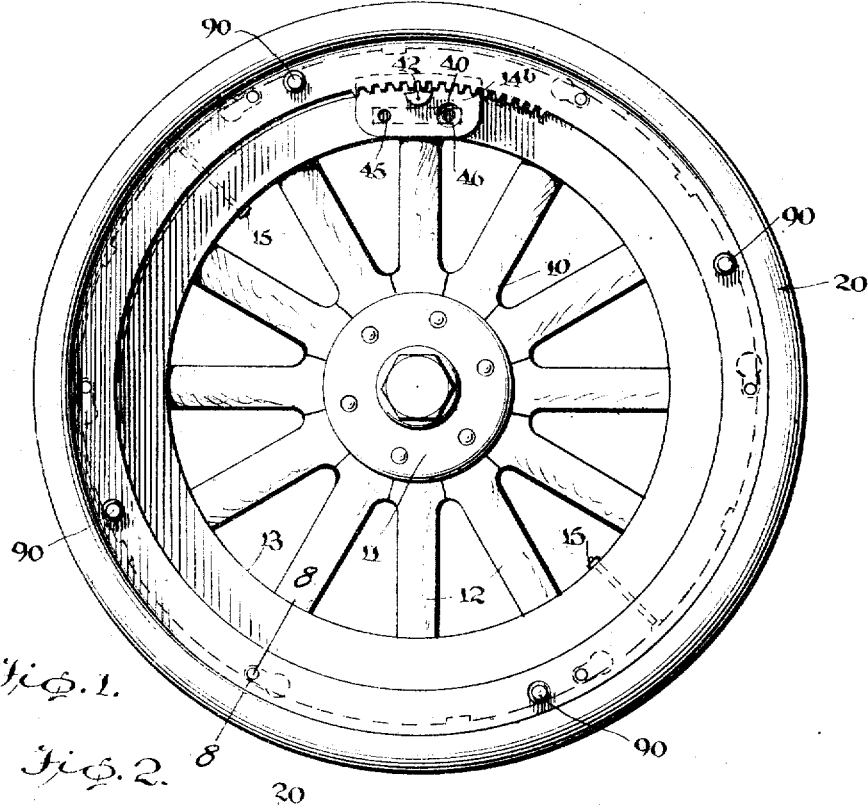
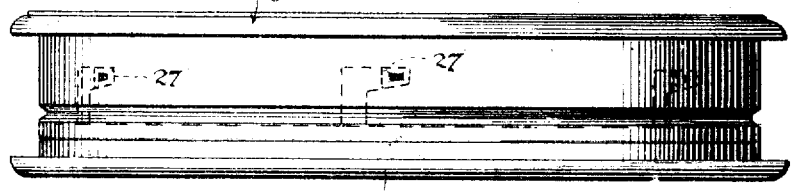
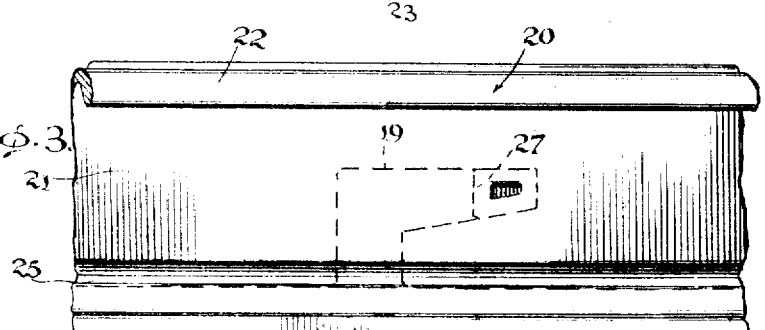

Aug. 21, 1923.
S. KAPLAN
1,465,715.
WHEEL FOR AUTOMOBILES
Filed Oct. 25, 1921
4 Sheets-Sheet 2
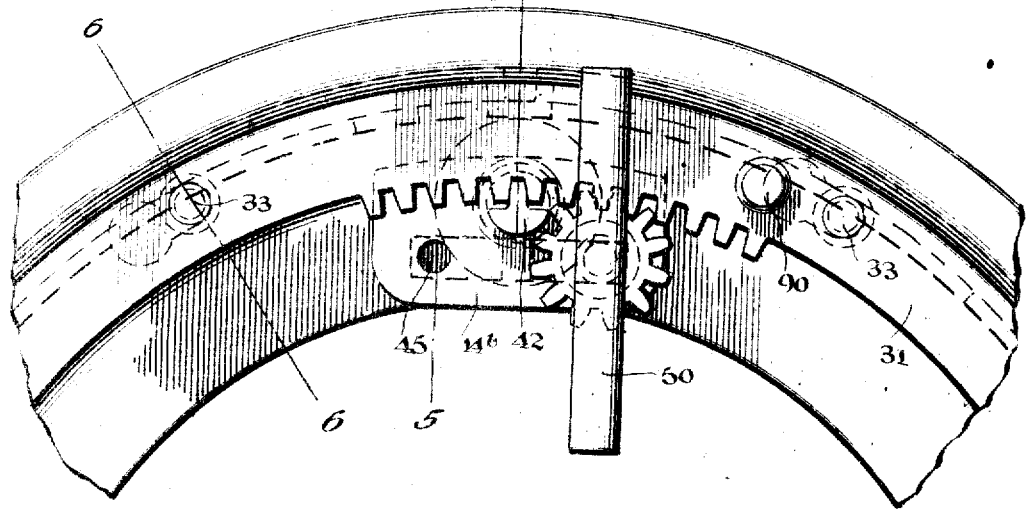
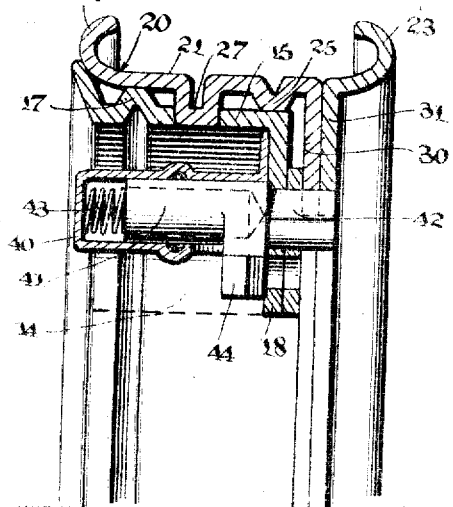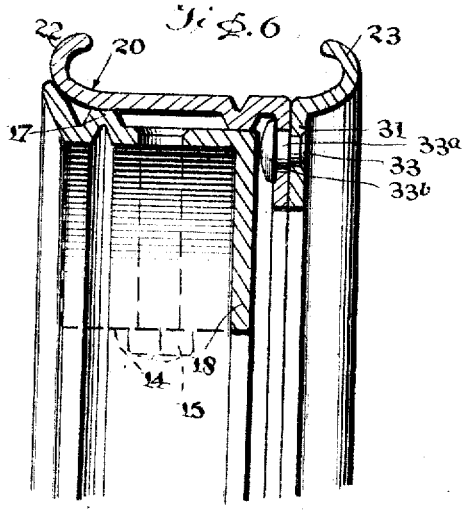
WITNESSES
R. E. Rousseau
INVENTOR
Samuel Kaplan,
BY
ATTORNEYS Aug. 21, 1923.
S. KAPLAN
WHEEL FOR AUTOMOBILES
Filed Oct. 25, 1921
1,465,715
4 Sheets-Sheet 3
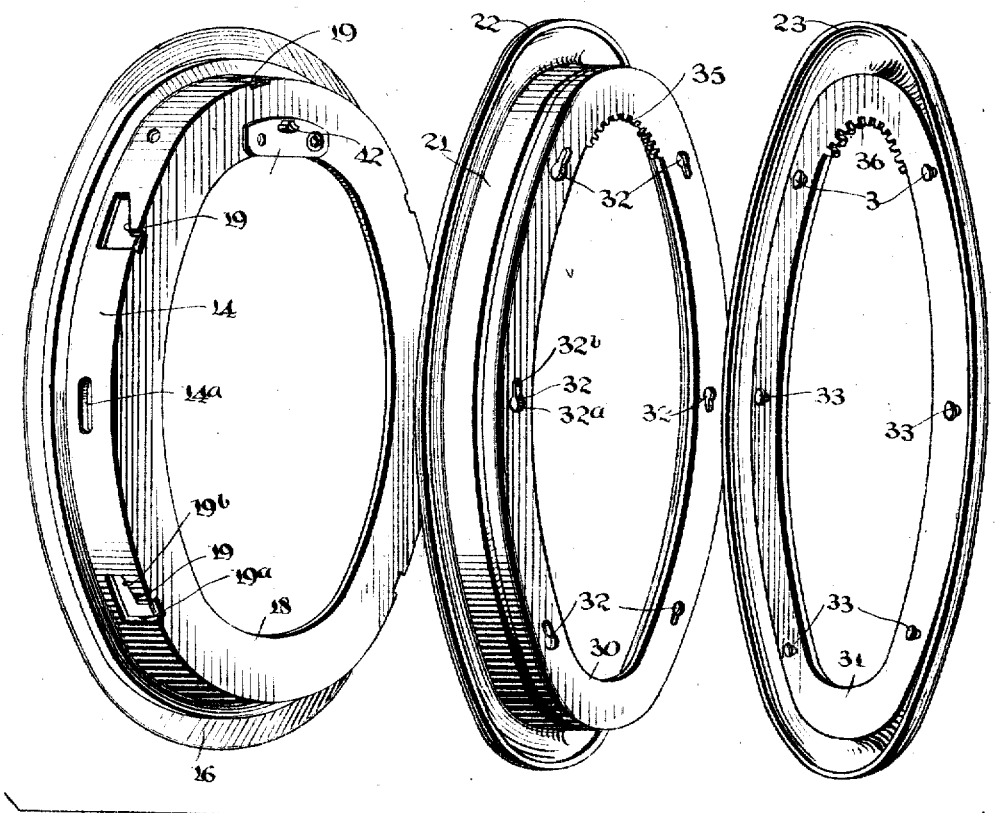
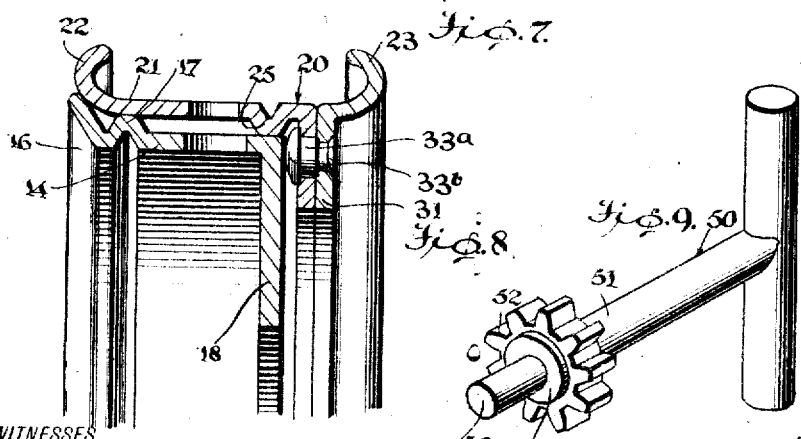
WITNESSES
INVENTOR
Samuel Kaplan,
BY
ATTORNEYS

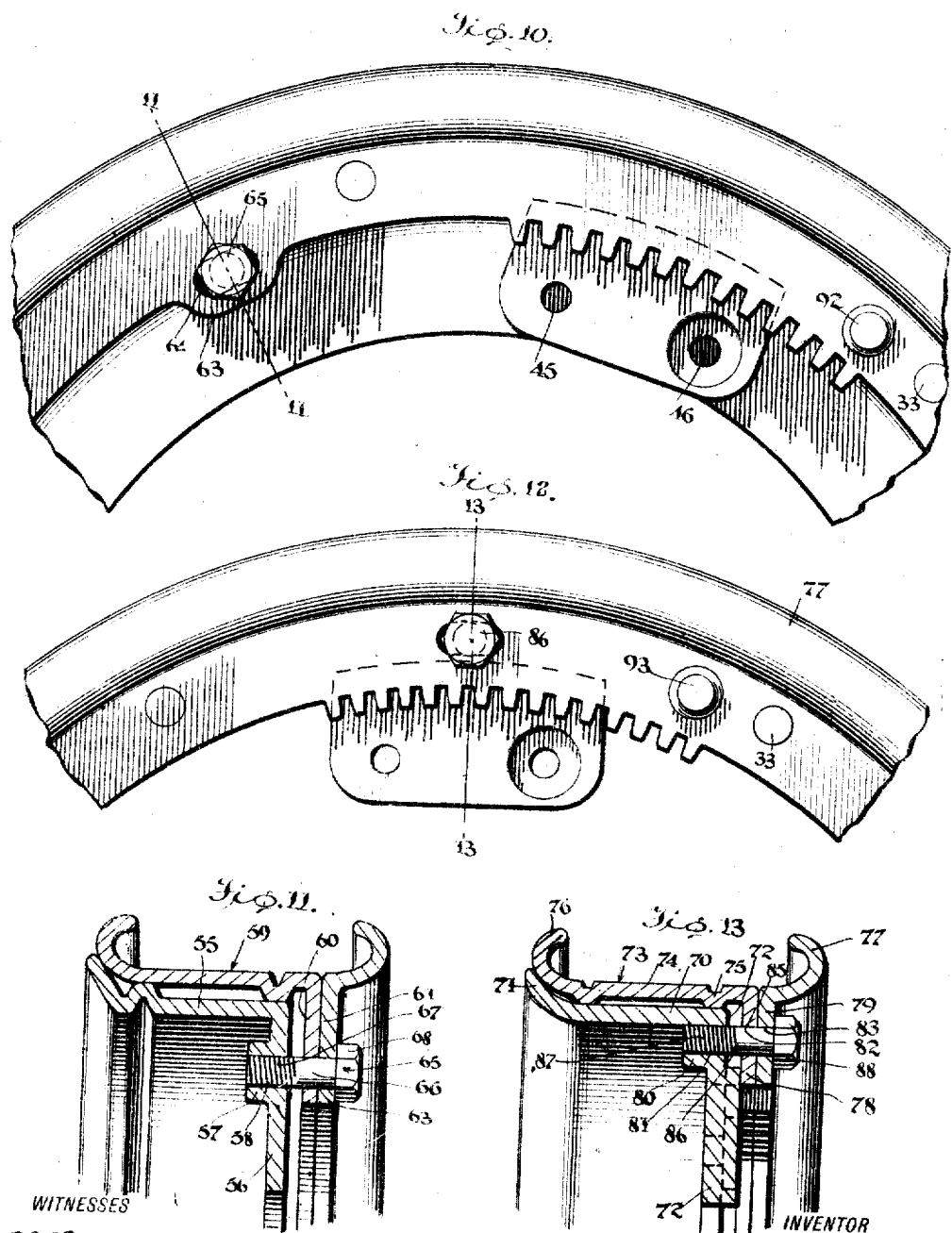

Patented Aug. 21, 1923.

1,465,715

UNITED STATES PATENT OFFICE.

SAMUEL KAPLAN, OF MONROE, LOUISIANA.

WHEEL FOR AUTOMOBILES.

Application filed October 25, 1921. Serial No. 510,275.

*To all whom it may concern:*

Be it known that I, SAMUEL KAPLAN, a citizen of the United States, and a resident of Monroe, in the parish of Ouachita and State of Louisiana, have invented certain new and useful Improvements in Wheels for Automobiles, of which the following is a specification.

This invention relates to an improvement in wheels for automobiles or other vehicles of the type including a demountable rim.

The object of the invention is to provide a wheel of this character which is especially adapted to be organized with the conventional wheel now universally employed on automobiles or other vehicles, which is susceptible of ready and economical manufacture by virtue of the fact that the parts thereof are in the main capable of being formed by stamping, pressing or similar mechanical process.

Another object is to provide a wheel of this character which is of simple and durable construction, reliable and convenient in operation and wherein the demountable rim is easily assembled with and disassembled from the wheel while being securely or releasably locked in assembly and the demountable rim itself being so constituted as to permit of the removal or displacement of the tire without the necessity of pinching the tire over the tire retaining flanges.

Other objects and advantages of the invention reside in certain novel features of construction, combination and arrangement of parts which will be hereinafter more fully described and particularly pointed out in the appended claim, reference being had to the accompanying drawings forming part of this specification, and in which:

Figure 1 is a side elevational view of a wooden wheel constructed in accordance with the present invention;

Figure 2 is a plan view of the wheel with the tire removed;

Figure 3 is an enlarged fragmentary view similar to Figure 1;

Figure 4 is an enlarged fragmentary view in front elevation, illustrating the operating means;

Figure 5 is a view in transverse section on line 5—5 of Figure 4;

Figure 6 is a similar view on line 6—6 of Figure 4;

Figure 7 is a group view in perspective, illustrating the fixed rim removed from the wheel, the demountable rim removed from the fixed wheel, and the tire retaining flange removed from the demountable rim;

Figure 8 is a view in transverse section, on line 8—8 of Figure 1;

Figure 9 is a detail perspective view of the operating tool or wrench;

Figure 10 is a fragmentary view in elevation, showing a slightly modified form;

Figure 11 is a view thereof in transverse section, on line 11—11 of Figure 10;

Figure 12 is an enlarged view, in fragmentary elevation of another modified form; and Figure 13 is a view thereof in section, on line 13—13 of Figure 12.

Referring to the drawings wherein for the sake of illustration is shown the preferred embodiment of the invention, the numeral 10 designates generally a wooden wheel of the type widely used on automobiles or other vehicles. It is to be understood however that the invention is also adapted to be embodied in other types of wheels, after the manner shown in applications Serial No. 484,922, filed July 11, 1921; Serial No. 506,766, filed October 10, 1921; Serial No. 483,923, filed July 11, 1921; Serial No. 507,813, filed October 15, 1921, and in Patent No. 1,383,810, of July 5, 1921, of which the present application is an improvement.

The wheel comprises a hub 11, spokes 12 and a felly 13. The felly band which is usually employed in conjunction with wheels of this character is removed and in place thereof a fixed rim 14 is positioned on the felly and is secured in position by means of radially extending bolts 15 or similar fastening means.

The fixed rim is constructed of resilient metal and is provided with a circumferential shoulder 16 around its inner marginal edge which is adapted to constitute an abutment for the demountable rim, and in the embodiments of the invention shown in Figures 1 to 11, inclusive, the fixed rim has a circumferential rib 17 pressed upwardly therefrom adjacent the shoulder 16. A locking plate 18 depends from the outer marginal edge of the fixed rim and preferably is formed integral with the fixed rim. When mounted on the felly this locking plate lies flush against the outer locking face of the felly. At spaced angular intervals about its periphery the fixed rim 14 is cut to provide locking slots 19 comprising entering sections 19ª extending transversely of the rim and tapered locking sections 19ᵇ extending circumferentially thereof. A slot, designated at 14ª, is provided to accommodate the tire valve.

A demountable rim, designated generally at 20, is provided and includes a base section 21, an inner fixed tire retaining flange 22 and an outer removable tire retaining flange 23 releasably secured to the base section of the rim in a manner to be hereinafter more fully described. The demountable rim is also constructed of resilient metal and adjacent the outer edge thereof, that is adjacent the tire retaining flange 23, the metal of the base section of the rim is pressed to provide a circumferential rib 25 which coacts with the rib 17 of the fixed rim to support the demountable rim on the fixed rim, the rib 17 extending upwardly and engaging the base section of the demountable rim and the rib 25 extending downwardly from the base section and engaging the fixed rim. By providing the inner rib 17 on the fixed rim and the outer rib 25 on the demountable rim the assembly on the demountable rim on the fixed rim is greatly facilitated. At spaced angular intervals, the base section 21 of the demountable rim is pressed to provide tapered lock lugs 27 which are cooperable with the locking slots 19 of the fixed rim and which are adapted to be passed laterally through the entering sections 19ª of the locking slots and then rotated circumferentially into the pivoted locking sections 19ᵇ of these slots in assembling the demountable rim on the fixed rim. The entering sections 19ª of the locking slots are of sufficient size to permit of the passage of the locking lugs 27 therethrough and the locking sections 19ᵇ are formed to correspond in contour with the lugs so as to enter into effective locking engagement therewith.

A locking plate 30 depends from the base section 21 of the demountable rim and in the assembly is disposed in confronting relation with respect to the locking plate 18 of the fixed rim, and a locking plate 31 depends from the tire retaining flange 23 and in the assembly this locking plate 31 lies flush against the locking plate 30.

Means is provided for releasably securing the removable tire retaining flange 23 in assembly with the demountable rim, and this means coacts with locking plates 30 and 31. For this purpose the locking plate 30 is formed with a series of openings or sockets 32 having entering sections 32ª and reduced locking sections 32ᵇ, and the locking plate 31 carries a plurality of headed locking studs or buttons 33 corresponding in number and arrangement to the sockets of the locking plate 30. The headed studs or buttons 33 comprise shanks 33ª suitably secured to the locking plate 30 and heads 33ᵇ integral with said shanks. In assembling the movable tire retaining flange with the demountable rim, the headed studs 33 are inserted through the entering sections 32ª of the sockets 32 and the removable tire retaining flange is then rotated so as to cause the shanks 33ª of the studs to pass into the locking sections 32ᵇ of the sockets 32 wherein the heads are confined behind the shoulders which define these locking sections of the sockets and whereby the removable tire retaining flange is releasably secured in assembly with the demountable rim.

The locking plates 30 and 31 are provided with toothed portions or gear segments, designated at 35 and 36, respectively, and which are so related to each other that when the removable tire retaining flange is assembled with the demountable rim with its locking abutments engaged with the locking sections of the sockets, the gear segments and the teeth thereof are in alinement.

Means cooperable with the gear segments is provided for releasably locking the removable tire retaining flange against circumferential movement with respect to the base section of the demountable rim and for locking the demountable rim against circumferential movement on the fixed rim. This means includes a tubular casing or housing 40 secured to the locking plate 18 and accommodated in the opening provided therefore in the felly. A carrier 41 is slidably arranged in the casing 40 and from one end thereof a bolt or locking pawl 42 extends, the bolt operating through an opening provided therefor in the locking plate 18 and in locking position this bolt enters the space between adjacent teeth of both the gear segments 35 and 36. A spring 43 is arranged in the casing 40 and coacts with the carrier to project the bolt 42. Release arms 44 which connect with the carrier are arranged below and offset therefrom so as to be disposed behind openings 45 and 46 provided in the flattened section 14ᵇ of the plate 18.

An operating tool or wrench, designated generally at 50, is provided and includes a shank 51 having a pinion 52 fixed thereon and provided at its end beyond the pinion with a reduced extension 53, a circular stop element 55 being provided between the extension 53 and the pinion. The wrench may be utilized either to remove the tire retaining flange 23 from the demountable rim leaving the rim on the wheel or to remove the demountable rim as an entity from the fixed rim.

When used to remove the flange 23 from the demountable rim, the extension 53 of the wrench is inserted in the opening 45 so that the extension 53 engages one of the release arms 54 and retracts the bolt 42 to such an extent that it no longer engages the teeth of the gear segment 36. The complete retraction of the bolt is prevented by the stop element 54 which engages the flat section 14$^b$ of the plate 18 and limits the inward movement of the extension 53. This stop element 54 also serves to prevent the pinion 52 from engaging the gear segment 35 although permitting it to mesh with the gear segment 36 in this position. Then when the wrench is turned in the proper direction the removable tire retaining flange is rotated so as to bring its locking buttons into alinement with the entering sections 32$^a$ of the sockets 32 so as to permit lateral movement of the tire retaining flange and its ready removal from the rim.

When it is desired to remove the demountable rim as an entity from the rim, the extension 53 of the wrench is inserted in the opening 46, as shown in Figure 4, and at this time, the stop element 54 is received in the recess or depression 46$^a$, the extension 53 engages the release arm 44 to effect complete retraction of the bolt and move it entirely out of engagement with both gear sections. At the same time the pinion 52 meshes with the teeth of the gear segments 35 and 36. Thus when the wrench is turned in the proper direction the demountable rim is moved circumferentially with respect to the fixed rim so as to rotate the locking lugs 27 out of the locking sections 19$^b$ of the locking slots and into alinement with the entering sections 19$^a$ thereof. When the locking lugs 27 of the demountable rim are alined with the entering sections of the slot 19, the locking lugs may be readily removed laterally with respect to the wheel.

When the operating tool is thus used it automatically releases the locking mechanism and at the same time serves to actuate either the removable tire retaining flange or the demountable rim through the desired movements. As soon as the operating tool is removed the spring 43 at once projects the locking bolt and if the demountable rim and the flange are assembled, the locking bolt is projected into the spaces between the teeth of the gear segments to automatically lock these sections in assembled position.

In lieu of the spring projected bolt 42 and associated locking and releasing mechanism the locking means shown in Figures 10 to 13 may be employed. In the form of this locking means shown in Figures 10 and 11, the fixed rim is designated at 55 and is identical in all respects with the fixed rim 14 except that its locking plate, designated at 56, is provided with a boss 57 which like the plate 56 is apertured and internally threaded to provide a threaded socket designated at 58. The demountable rim is designated generally at 59 and is identical in all respects with the demountable rim 58 except that its locking plate designated at 60 and 61 are provided with enlargements, designated at 62 and 63, the enlargements having slightly elongated openings 64 provided therein. A locking bolt 65 is provided and includes a shank 66 adapted to be extended through the openings 64 of the locking plates 60 and 61 of the demountable rim and to have its threaded portion 67 engaged with the slot 58 of the plate 56, the head 68 of the bolt entering into clamping engagement with the outer face of the enlargement 63 of the plate 61. In this form of the invention, the bolt 65 must be removed before the operating tool is utilized to move the retaining flange or the demountable rim but in all other respects this embodiment is identical with the embodiment above described.

In the form of the invention shown in Figures 12 and 13, the fixed rim is designated generally at 70 and includes a circumferential shoulder 71 extending around its inner marginal edge and a locking plate 72 depending from its outer marginal edge, the locking plate being provided adjacent the fixed rim with an annular channel 72. The demountable rim is designated at 73 and includes a base section 74 having a pair of circumferentially extending ribs 75 pressed therefrom, a fixed tire retaining flange 76 and a removable tire retaining flange 77. Locking plates, designated at 78 and 79 are carried by the base section 74 and the removable tire retaining flange 77, respectively. In the assembly, the locking plate 78 abuts around its lower edge against the locking plate 72. The locking plate 72 is provided with a boss 80 and the boss and the locking plate are bored and internally threaded to provide a threaded socket 81 which is alined with elongated openings 82 and 83 provided in the locking plates 78 and 79. A locking bolt 85 is provided and has its shank 86 extending through the openings 82 and 83 and the threaded portion of 87 of the shank engaged with the threaded socket 81, the head 88 of the bolt engaging the outer face of the plate 79. In this embodiment of the invention the locking bolt is disposed immediately above the gear segments whereas in the embodiment shown in Figures 10 and 11 the locking bolt is disposed at a point slightly adjacent the gear segments. The operation of the embodiment shown in Figures 12 and 13 is precisely the same as that described in conjunction with the embodiment shown in Figures 1 to 11 except that the bolt 86 must be removed to release the demountable rim and the tire retaining flange for circumferential movement.

In all embodiments of the invention hammer lugs or bosses, designated at 90 in Figure 1, at 92 in Figure 10 and 93 in Figure 12 may be provided to facilitate the removal of the tire retaining flange.

In this manner the rim may be associated and removed with a minimum expenditure of time and effort. When assembled, the rim is securely held in position and at the same time it may be removed without requiring the exercise of any special skill or any special tool other than the operating tool or wrench 50 which is provided as a part of the organization.

I claim:

In a wheel, a fixed rim having a locking plate, a demountable rim including a base section having a locking plate and a removable tire retaining flange having a locking plate, cooperating means between the fixed rim and the demountable rim for releasably securing the demountable rim on the fixed rim against all except circumferential movement, cooperating means between the locking plate of the tire retaining flange and the locking plate of the base section for releasably securing the tire retaining flange against all except circumferential movement, and common locking mechanism cooperable with the locking plates of the fixed rim and of the demountable rim for securing the demountable rim and the tire retaining flange against circumferential movement and including a locking bolt cooperable with the locking plates.

SAMUEL KAPLAN.